United States Patent
Sillard et al.

(10) Patent No.: US 6,668,120 B2
(45) Date of Patent: Dec. 23, 2003

(54) FIBER FOR COMPENSATING THE CHROMATIC DISPERSION OF AN NZ-DSF HAVING POSITIVE CHROMATIC DISPERSION

(75) Inventors: Pierre Sillard, Le Chesnay (FR);
 Maxime Gorlier, Paris (FR);
 Louis-Anne de Montmorillon, Paris (FR); Ludovic Fleury, Bois D'Arcy (FR); Florent Beaumont, Conflans Ste Honorine (FR); Pascale Nouchi, Maisons Laffitte (FR)

(73) Assignee: Alcatel, Paris (FR)

( * ) Notice: Subject to any disclaimer, the term of this patent is extended or adjusted under 35 U.S.C. 154(b) by 248 days.

(21) Appl. No.: 09/976,012

(22) Filed: Oct. 15, 2001

(65) Prior Publication Data

US 2002/0090186 A1 Jul. 11, 2002

(30) Foreign Application Priority Data

Oct. 16, 2000 (FR) .......................................... 00 13209

(51) Int. Cl.[7] ................................................ G02B 6/02
(52) U.S. Cl. ...................................................... 385/123
(58) Field of Search ................................ 385/123, 124, 385/126, 127, 24, 147; 359/126, 161, 173

(56) References Cited

U.S. PATENT DOCUMENTS

| | | | | |
|---|---|---|---|---|
| 3,508,589 A | * | 4/1970 | Burton et al. | 139/420 R |
| 5,737,472 A | * | 4/1998 | Bernasson et al. | 385/123 |
| 5,781,679 A | * | 7/1998 | Li et al. | 385/48 |
| 5,905,837 A | * | 5/1999 | Wang et al. | 385/123 |
| 5,995,694 A | | 11/1999 | Akasaka et al. | |
| 6,044,191 A | * | 3/2000 | Berkey et al. | 385/123 |
| 6,591,050 B2 | * | 7/2003 | Fleury et al. | 385/123 |
| 2002/0054743 A1 | * | 5/2002 | Montmorillon et al. | 385/123 |
| 2002/0067903 A1 | * | 6/2002 | Fleury et al. | 385/123 |
| 2002/0090186 A1 | * | 7/2002 | Sillard et al. | 385/123 |

FOREIGN PATENT DOCUMENTS

| | | | |
|---|---|---|---|
| EP | 0 668 520 A2 | 8/1995 | |
| EP | 1 030 199 A1 | 8/2000 | |
| EP | 1 067 412 A1 | 1/2001 | |
| JP | 182057 A * | 6/2002 | 385/123 |
| WO | WO99/23041 * | 5/1999 | 385/123 |
| WO | WO 99/42869 | 8/1999 | |
| WO | WO/00/79319 A1 * | 12/2000 | 385/123 |

OTHER PUBLICATIONS

A. J. Antos et al, "Design and Characterization of Dispersion Compensating Fiber Based on the LP01 Mode":Journal of Lightwave Technology, IEEE, NY, US, vol. 12, No. 10, Oct. 1, 1994, pp. 1739–1744 XP000469527.

* cited by examiner

*Primary Examiner*—Akm Enayet Ullah
(74) *Attorney, Agent, or Firm*—Sughrue Mion, PLLC

(57) ABSTRACT

A chromatic dispersion-compensating fiber adapted to compensate the chromatic dispersion of an SMF or an NZ-DSF having positive chromatic dispersion presents chromatic dispersion which is negative and greater than or equal to −150 ps/(nm.km) at a wavelength of 1550 nm, and a theoretical cutoff wavelength longer than 1800 nm. At 1550 nm, the fiber presents a ratio of chromatic dispersion over chromatic dispersion slope lying in the range 30 nm to 500 nm. The fiber can present a rectangle or a trapezium profile together with a buried trench and a ring. It can be used in a line or in a module to compensate the chromatic dispersion and the chromatic dispersion slope in transmission systems in which the line fiber is an SMF or an NZ-DSF having positive chromatic dispersion.

23 Claims, 1 Drawing Sheet

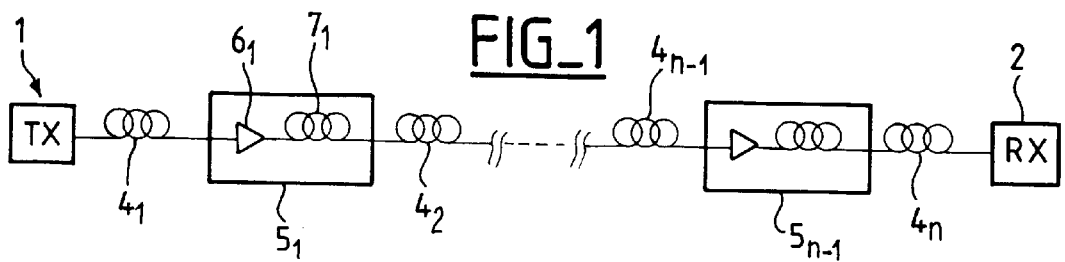
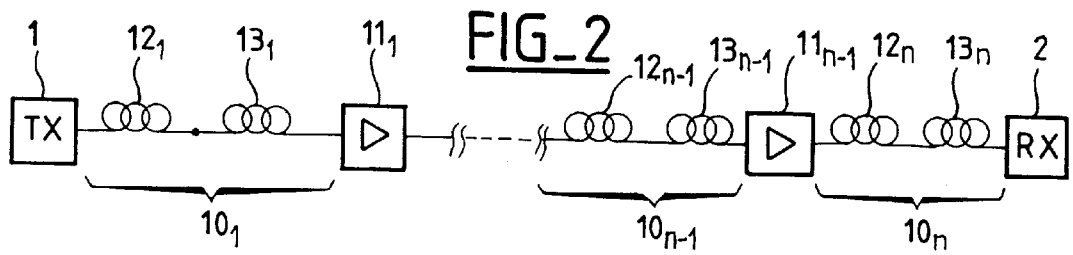
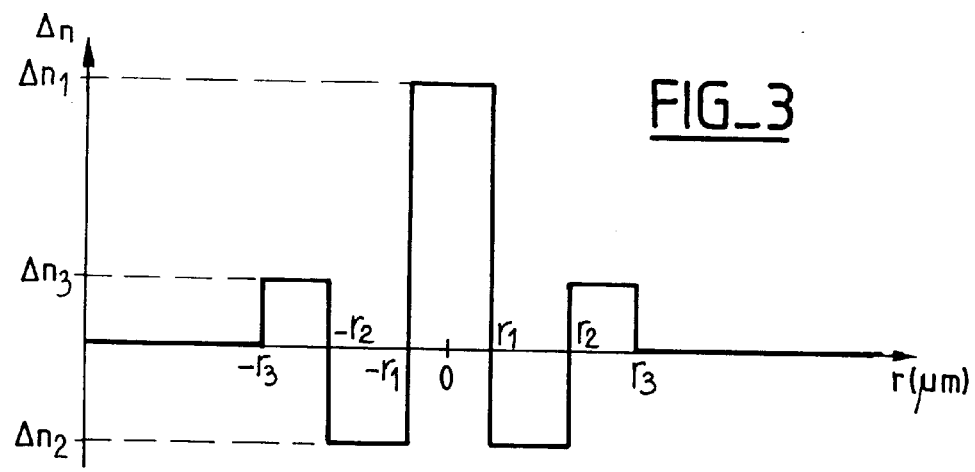
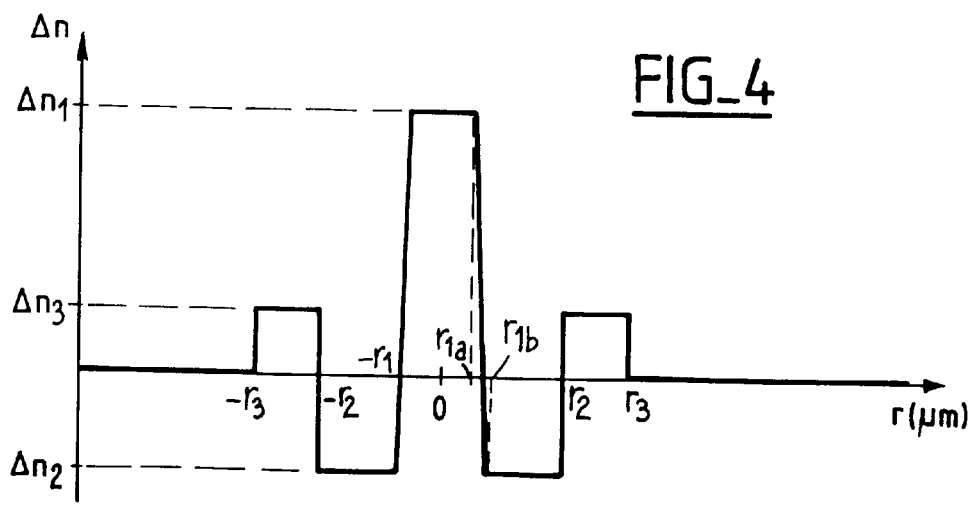

FIBER FOR COMPENSATING THE CHROMATIC DISPERSION OF AN NZ-DSF HAVING POSITIVE CHROMATIC DISPERSION

The present invention relates to the field of optical fiber transmission, and more specifically it relates to compensating chromatic dispersion and chromatic dispersion slope in optical fiber transmission systems.

BACKGROUND OF THE INVENTION

The refractive index profile of an optical fiber is generally described in terms of the appearance of a graph plotting the refracting index to the fiber as a function of radius. The distance r from the center of the fiber is conventionally plotted along the abscissa, and the difference in refractive index relative to that of the cladding of the fiber is plotted up the ordinate. The term "step", "trapezium", and "triangle" are therefore used with respect to index profiles whose graphs are respectively step-shaped, trapezium-shaped, and triangular. These curves are generally representative of the ideal or theoretical profile for the fiber, and fiber manufacturing constraints can yield a profile that departs perceptibly therefrom.

In new high bit rate transmission networks that are in wavelength division multiplex (WDM), it is advantageous to manage chromatic dispersion, in particular for bit rates faster than or equal to 10 gibabits per second (Gbit/s); the idea that for all wavelength values of the multiplex chromatic compensation should accumulate to substantially zero over the link as a whole, so as to limit the extent to which pulses widen. Over an entire transmission system, it is acceptable for the cumulative value of dispersion to be a few hundreds of picoseconds per nanometer (ps/nm). It is also beneficial to avoid zero values for chromatic dispersion in the vicinity of the wavelengths actually used in the system since that makes them more subject to non-linear effects. Finally, it is also beneficial to limit the chromatic dispersion slope over the wavelength range of the multiplex so as to avoid or limit distortion between the channels of the multiplex. This problem of compensating chromatic dispersion and chromatic dispersion slope is particularly severe with very high bit rate transmission systems, typically for WDM transmission systems having per channel rates of 40 Gbit/s and above. The problem becomes more severe with bandwidth increasing up to values greater than or equal to 30 nanometers (nm) or even to 35 nm.

Conventionally, the line fibers used in optical fiber transmission systems are step-index fibers; these fibers are commonly referred to as single-mode fibers (SMFs) and they are described in Recommendation ITU-T G.652. Thus, the Applicant markets a step index monomode fiber under the reference ASMF 200 which presents a chromatic dispersion nulling wavelength $\lambda_0$ in the range 1300 nm to 1320 nm, and chromatic dispersion of 3.5 picoseconds per nanometer kilometer (ps/(nm.km)) in a range of 1285 nm to 1330 nm, and of 18 ps/(nm.km) at 1550 nm. The chromatic dispersion slope at 1550 nm is about 0.05 picoseconds per square nanometer-kilometer (ps/(nm².km)). In conventional transmission systems, that fiber is used for conveying signals at wavelengths close to 1550 nm (band C).

Dispersion-shifted fibers (DSF) have also appeared on the market. These fibers are such that at the transmission wavelength at which they are used, which is generally different from the wavelength of 1.3 micrometers ($\mu$m) at which the dispersion of silica is substantially zero, their chromatic dispersion is substantially zero. In other words the non-zero chromatic dispersion of silica is compensated, hence the term "shifted", by increasing the index difference $\Delta n$ between the core of the fiber and the cladding. The index difference enables the wavelength at which chromatic dispersion is zero to be shifted; it is obtained by introducing dopants into the preform, during manufacture thereof, e.g. by the conventional modified chemical vapor deposition (MCVD) process, which is not described in greater detail herein.

The term "non-zero dispersion-shifted fibers" (NZ-DSF) is used for dispersion-shifted fibers that present positive, non-zero chromatic dispersion for the wavelengths at which they are used. Such fibers, at these wavelengths, present little chromatic dispersion, typically less than 10 ps/(ns.km) at 1550 nm, and they present chromatic dispersion slope in the range 0.04 ps/(nm².km) to 0.1 ps/(nm².km). Thus, FR-A-2 790 107 proposes a line fiber which is particularly adapted to transmitting a WDM with channels spaced apart by 100 gigahertz (GHz) or less for bit rates per channel of 10 Gbit/s or more; that fiber has, at a wavelength of 1550 nm, an effective sectional area greater than or equal to 60 $\mu m^2$, chromatic dispersion lying in the range 6 ps/(nm.km) to 10 ps/(nm.km), and chromatic dispersion slope of less than 0.07 ps/(nm².km).

To compensate the chromatic dispersion and the chromatic dispersion slope in SMFs or in NZ-DSFs used as line fiber, it is known to use short lengths of dispersion compensating fiber (DCF). Such a fiber presents chromatic dispersion and chromatic dispersion slope of sign opposite to that of the chromatic dispersion and chromatic dispersion slope of the line fiber. An example applicable to an SMF line fiber is given by L. Grüner-Nielsen et al. in "Large volume manufacturing of dispersion compensating fibers", OFC'98 Technical Digest TuD5. Other examples of dispersion-compensating fibers adapted to SMFs are described in EP-A-0 935 146, U.S. Pat. No. 5,568,583, and U.S. Pat. No. 5,361,319.

WO-A-99 13366 proposes a dispersion-compensating fiber for use in compensation modules to compensate the chromatic dispersion and the chromatic dispersion slope of a fiber of the type marketed by Lucent under the trademark "True Wave". That fiber presents chromatic dispersion in the range 1.5 ps/(nm.km) to 4 ps/(nm.km) and a chromatic dispersion slope of 0.07 ps/(nm².km). The dispersion-compensating fiber proposed in one of the embodiments presents chromatic dispersion of −27 ps/(nm.km) and a chromatic dispersion slope of −1.25 ps/(nm².km), for a theoretical cutoff wavelength shorter than 1100 nm.

EP-A-0 674 193 proposes a dispersion-compensating fiber for SMF that presents a chromatic dispersion value lying in the range −85 ps/(nm.km) to −20 ps/(nm.km); the theoretical cutoff wavelength is not specified in that document; computations to determine the properties of that fiber show that the theoretical cutoff wavelength is shorter than 1100 nm.

U.S. Pat. No. 5,838,867 proposes a dispersion-compensating fiber for use in line or in a module to compensate the chromatic dispersion of a shifted dispersion line fiber. The chromatic dispersion at 1550 nm for the fibers described by way of example lies in the range −60 ps/(nm.km) to −2 ps/(nm.km); the cutoff wavelength as measured on two meters of fiber is shorter than 1000 nm, and computations on the properties of the fibers show that the theoretical cutoff wavelength is shorter than 1100 nm.

Lucent Technologies markets broad-band dispersion-compensating modules (for band C) which serve to compensate the chromatic dispersion and the chromatic dispersion slope of an SMF. The ratio of chromatic dispersion over chromatic dispersion slope in the fiber used in those modules is about 925 nm at a wavelength of 1550 nm. At 1550 nm, the fiber presents dispersion close to −100 ps/(nm.km), and a theoretical cutoff wavelength shorter than 1800 nm. Lucent Technologies also markets dispersion-compensating modules for band C NZ-DSFs. Those modules compensate only 65% of the chromatic dispersion slope of an NZ-DSF of the "true wave reduced slope" type (chromatic dispersion lying in the range 1.5 ps/(nm.km) to 4 ps/(nm.km) and a chromatic dispersion slope of about 0.045 ps/(nm$^2$.km)). The typical value for the ratio of chromatic dispersion over chromatic dispersion slope is about 150 nm at a wavelength of 1550 nm. At 1550 nm, the fiber presents dispersion close to −100 ps/(nm.km), and a theoretical cutoff wavelength shorter than 1800 nm.

Craig D. Poole et al., in "Optical fiber-based dispersion compensation using higher order modes near cutoff" suggests injecting light into a dispersion-compensating fiber using a mode for which the cutoff wavelength is close to the wavelength used. Since chromatic dispersion is large in the vicinity of the cutoff wavelength, the quantity of dispersion-compensating fiber required is reduced. That solution implies using a mode converter on input to the dispersion-compensating fiber; the mode converter must have good efficiency so that all of the light is in fact conveyed in the desired mode.

U.S. Pat. No. 5,999,679 proposes a dispersion-compensating fiber having a large effective area and a theoretical cutoff wavelength longer than 1900 nm. At 1550 nm, two examples of fibers proposed in that document present negative chromatic dispersion close to −280 ps/(nm.km), and a ratio of chromatic dispersion over chromatic dispersion slope of 116 nm or 227 nm. The effective area of the proposed fibers is 19 $\mu$m$^2$ or 22 $\mu$m$^2$. The proposed profile is a rectangular profile with a buried trench and a ring. For those two examples, bending losses are very large (about 0.3 decibels (dB) at 1550 nm for a coil of 100 turns wound with a radius of 30 millimeters (mm), and about 600 decibels per meter (dB/m) at 1550 nm for winding with a radius of 10 mm). In addition, it is difficult to control polarization mode dispersion in the fibers of that document.

The problem raised by the fibers of that document lies in the losses due to bending and to polarization mode dispersion.

OBJECTS AND SUMMARY OF THE INVENTION

The invention solves this problem. It provides a fiber which can be used as a line fiber or in a module, for the purpose of compensating chromatic dispersion and chromatic dispersion slope in an SMF or an NZ-DSF. The fiber of the invention presents a ratio of chromatic dispersion over attenuation which is better than that in the prior art.

More precisely, the invention provides an optical fiber presenting a theoretical cutoff wavelength longer than or equal to 1800 nm, chromatic dispersion that is negative and greater than or equal to −150 ps/(nm.km), and a ratio of chromatic dispersion over chromatic dispersion slope lying in the range 30 nm to 500 nm for a wavelength of 1550 nm.

Advantageously, the fiber can present one or more of the following additional characteristics:
  bending losses less than 400 dB/m, and preferably less than 100 dB/m, for a wavelength in the range 1530 nm to 1620 nm, when the fiber is wound on a former having a radius of 10 mm;
  bending losses less than 0.05 dB, and preferably less than 10$^{-3}$ dB, for a wavelength lying in the range 1530 nm to 1620 nm, for a coil of 100 turns on a former having a radius of 30 mm;
  a ratio of chromatic dispersion over attenuation less than or equal to −100 picoseconds per nanometer decibel (ps/(nm.dB)), and preferably less than or equal to −150 ps/(nm.dB), for a wavelength lying in the range 1530 nm to 1620 nm;
  for a wavelength of 1550 nm, an effective area greater than or equal to 12 $\mu$m$^2$, preferably greater than or equal to 15 $\mu$m$^2$, or even 20 $\mu$m$^2$;
  for a wavelength of 1550 nm, chromatic dispersion less than or equal to −20 ps/(nm.km), preferably less than or equal to −50 ps/(nm.km);
  for a wavelength of 1500 nm, sensitivity to microbends less than or equal to 1, and preferably less than or equal to 0.5;
  an index difference between the index at any point of the fiber and the index of the cladding that is less than or equal to 30×10$^{-3}$, and preferably less than or equal to 25×10$^{-3}$;
  polarization mode dispersion less than or equal to 0.5 picoseconds per root kilometer (ps/km$^{1/2}$);
  attenuation less than 1 dB/km; and
  a theoretical cutoff wavelength longer than or equal to 1850 nm.

The fiber advantageously presents a rectangle or trapezium index profile together with a depressed trench and a ring. In which case, the profile can be characterized by:
  the difference ($\Delta n_1$) between the index of the rectangle or of the trapezium and the index of the cladding lies in the range 16×10$^{-3}$ to 24×10$^{-3}$, and the radius ($r_1$) of the portion of the fiber presenting an index greater than that of the cladding lies in the range 1.5 $\mu$m and 2.3 $\mu$m;
  the difference ($\Delta n_2$) between the index of the depressed trench and the index of the cladding lies in the range −7.5×10$^{-3}$ to −3.5×10$^{-3}$, and the outer radius ($r_2$) of the trench lies in the range 4.5 $\mu$m to 6.9 $\mu$m; and
  the difference ($\Delta n_3$) between the index of the ring and the index of the cladding lies in the range 3×10$^{-3}$ to 16×10$^{-3}$, preferably in the range 3×10$^{-3}$ to 14×10$^{-3}$, and the outer radius ($r_3$) of the ring lies in the range 6.8 $\mu$m to 8.5 $\mu$m.

It is also possible to use one or more of the following characteristics to qualify the profile:
  twice the integral of the product of the radius multiplied by the index between zero radius and the outer radius ($r_1$) of the central portion of the fiber presenting an index greater than that of the cladding lies in the range 40×10$^{-3}$ $\mu$m$^2$ to 100×10$^{-3}$ $\mu$m$^2$, preferably in the range 50×10$^{-3}$ $\mu$m$^2$ to 80×10$^{-3}$ $\mu$m$^2$;
  three times the integral of the product of the square of the radius multiplied by the index between zero radius and the outer radius ($r_1$) of the central portion of the fiber presenting an index greater than that of the cladding lies in the range 60×10$^{-3}$ $\mu$m$^3$ to 200×10$^{-3}$ $\mu$m$^3$, preferably in the range 70×10$^{-3}$ $\mu$m$^3$ to 150×10$^{-3}$ $\mu$m$^3$; and
  twice the integral of the product of the radius multiplied by the index between the inner radius and the outer radius of the ring lies in the range 140×10$^{-3}$ $\mu$m$^2$ to 350×10$^{-3}$ $\mu$m$^2$, and preferably in the range 160×10$^{-3}$ $\mu$m$^2$ to 310×10$^{-3}$ $\mu$m$^2$.

The invention also proposes a transmission system in which the line fiber comprises a step index monomode fiber or a dispersion-shifted fiber, dispersion-compensated by such a fiber. Under such circumstances, the cumulative chromatic dispersion in each channel in the range 1530 nm to 1610 nm can be less than 100 ps/nm, for example, and preferably less than 50 ps/nm, on average for transmission over a distance of 100 km.

The line fiber can be constituted solely by step index monomode fiber or solely by dispersion-shifted fiber. It is also possible to provide for the line fiber to be constituted both by step index monomode fiber and by dispersion-compensating fiber, or indeed for the line fiber to be constituted both by dispersion-shifted fiber and by dispersion-compensating fiber.

Finally, the invention proposes a dispersion-compensating module comprising an amplifier and a segment of the above-described fiber.

BRIEF DESCRIPTION OF THE DRAWING

Other characteristics and advantages of the invention will appear on reading the following description of embodiments of the invention, given as examples and with reference to the accompanying drawing, in which:

FIGS. 1 and 2 are diagrams showing embodiments of a transmission system of the invention; and FIGS. 3 and 4 are examples of fiber profiles of the invention.

MORE DETAILED DESCRIPTION

The invention proposes a chromatic dispersion-compensating fiber adapted to compensate the chromatic dispersion of a step index monomode fiber or of an NZ-DSF in band C and in band L. The fiber has a theoretical cutoff wavelength longer than or equal to 1800 nm, negative chromatic dispersion greater than or equal to −150 ps/(nm.km), and a ratio of chromatic dispersion over chromatic dispersion slope lying in the range 30 nm to 500 nm at a wavelength of 1550 nm. At this wavelength, the figure of merit or ratio of chromatic dispersion over attenuation is advantageously less than or equal to −100 ps/(nm.dB). The fiber also has large effective section area, making it possible to reduce non-linear effects, even with high transmission powers.

Compared with document U.S. Pat. No. 5,999,689, selecting chromatic dispersion that is negative and greater than −150 ps/(nm.km) makes it possible to reduce bending losses, other things remaining equal. For a given figure of merit, chromatic dispersion values of about −280 ps/(nm.km) or less as proposed in that prior art document give rise to greater bending losses that are difficult to make compatible with using the dispersion-compensating fiber in a module or as a line fiber for such chromatic dispersion values.

In addition, selecting a chromatic dispersion value greater than −150 ps/(nm.km) makes it possible to improve polarization mode dispersion. For a given value of fiber ovalness, less-negative chromatic dispersion gives rise to better polarization mode dispersion. Fibers of the invention typically present a polarization mode dispersion value below 0.5 ps/km$^{1/2}$.

The fiber of the invention makes it possible to compensate chromatic dispersion and chromatic dispersion slope for transmission systems operating in band C and in band L by using as the line fiber a conventional step index monomode fiber or indeed an NZ-DSF. As mentioned above, around 1550 nm, SMF typically presents chromatic dispersion of 15 ps/(nm.km) to 20 ps/(nm.km) and chromatic dispersion slope of around 0.06 ps/(nm$^2$.km), giving a typical ratio of chromatic dispersion over chromatic dispersion slope of about 300. At the same wavelength, NZ-DSFs presents ratios of chromatic dispersion over chromatic dispersion slope in the range 50 nm to 200 nm.

The invention also provides optical fiber transmission systems in which the line fiber comprises an SMF or an NZ-DSF; said fiber presenting positive chromatic dispersion around 1550 nm for which chromatic dispersion and chromatic dispersion slope are compensated by a fiber of the invention.

FIG. 1 is a diagram of a first embodiment of a transmission system of the invention. The figure shows a transmitter TX and a receiver RX 2. These two elements are interconnected by a plurality of line fiber segments $4_1$ to $4_n$. The term "line fiber" is used to mean the fiber extending along the transmission system and whose length corresponds substantially to the transmission distance of the system. In the embodiment of FIG. 1, the line fiber is constituted by an SMF or an NZ-DSF. Dispersion-compensating repeater modules $5_1$ to $5_{n-1}$ are disposed between the segments. A dispersion compensating module $5_i$ comprises an amplifier $6_i$, typically an erbium-doped fiber amplifier, followed by a segment of dispersion-compensating fiber $7_i$. The figure does not show the filters and other elements that have no direct bearing on the operation of the invention.

The light coming from the line fiber is amplified, after which it passes through the dispersion-compensating fiber segment where chromatic dispersion and chromatic dispersion slope are compensated. It would also be possible to interchange the respective positions of the dispersion-compensating fiber and the amplifier within the compensation module.

FIG. 2 shows another embodiment of a transmission system of the invention. In the embodiment of FIG. 2, the dispersion-compensating fiber of the invention is also used as a line fiber. This figure has the same transmitter TX 1 and receiver RX 2. These two elements are interconnected by a plurality of line fibers segments $10_i$ interconnected by repeaters $11_i$. Each repeater comprises amplifiers, filters, and other conventional elements, and is not described in greater detail. Each line fiber segment $10_i$ includes both a segment $12_i$ of SMF or of NZ-DSF, and also a segment $13_i$ of dispersion-compensating fiber of the invention.

The embodiments of FIGS. 1 and 2 constitute two extremes: in the embodiment of FIG. 1, the line fiber is constituted solely by SMF or NZ-DSF, and all of the dispersion-compensating fiber is located in discrete modules. Under such circumstances, the dispersion-compensating fiber does not contribute in any way to the length of the transmission system. This embodiment is particularly suitable for presently-existing connections, e.g. using SMF, which can thus be modified to enable them to transmit in band C and in band L, using wavelength multiplexing at a high bit rate. Conversely, in the embodiment of FIG. 2, the dispersion-compensating fiber also serves as line fiber, and the repeaters do not contain any dispersion-compensating fiber. Solutions intermediate between the solution of FIG. 1 and that of FIG. 2 are also possible.

In both cases, the respective lengths $L_{DCF}$ and $L_+$ of the dispersion-compensating fiber of the invention and of the positive chromatic dispersion fiber are selected in such a manner that:

$$L_{DCF} \times C_{DCF} = -L_+ \times C_+$$

where $C_{CDF}$ is the chromatic dispersion of the dispersion-compensating fiber at the selected wavelength in the range 1530 nm to 1610 nm and $C_+$ is the positive chromatic dispersion of the SMF or the NZ-DSF at the same wavelength. This relationship ensures that the cumulative chromatic dispersion in the positive chromatic dispersion fiber is compensated in the dispersion-compensating fiber at that wavelength. It is possible to relax this constraint and accept a margin of error of about 20% and still conserve sufficient compensation.

By way of example, a transmission system of the kind shown in FIG. 1 could have SMF segments of length $L_+$ equal to 100 km, together with associated lengths $L_{DCF}$ equal to 22 km in the modules. At 1550 nm, the SMF presents chromatic dispersion of 18 ps/(nm.km) and a chromatic dispersion slope of 0.06 ps/(nm².km); the DCF is a fiber of the kind described with reference to FIG. 3 and it corresponds more precisely to Example 4 of Table 1. At a wavelength of 1550 nm it has chromatic dispersion of −81 ps/(nm.km) and a ratio of chromatic dispersion over chromatic dispersion slope of 305 nm, while at a wavelength of 1590 nm it has chromatic dispersion of −95 ps/(nm.km) and a ratio of chromatic dispersion over chromatic dispersion slope of 480 nm. Under such circumstances, the cumulative chromatic dispersion at 1550 nm is close to 0 ps/nm. A WDM signal can be transmitted with cumulative chromatic dispersion of less than 50 ps/nm for each of the channels in the range 1530 nm to 1610 nm for the 100 km formed by one segment of the transmission system. This makes it possible to limit cumulative chromatic dispersion to values that are below a few hundreds of ps/nm, as mentioned above. On average, for a 100 km transmission distance over each channel, cumulative chromatic dispersion is limited to less than 100 ps/nm.

Consideration is now given to another example, still of the kind shown in FIG. 1, but in which the line fiber is an NZ-DSF. At 1550 nm, the line fiber presents chromatic dispersion of 8 ps/(nm.km) and chromatic dispersion slope of 0.06 ps/(nm².km). The length $L_+$ is 100 km while the length $L_{DCF}$ of the DCF of the invention is 10 km. The DCF is the fiber of Example 3 in Table 1. Under such circumstances, the cumulative chromatic dispersion is less than 50 ps/nm for each channel in the range 1530 nm to 1610 nm, for the 100 km formed by one segment of the transmission system. In both cases, the fiber of the invention serves to compensate both chromatic dispersion and chromatic dispersion slope of the line fiber.

The characteristics of the dispersion-compensating fiber of the invention are described below prior to describing an embodiment. The fiber has a theoretical cutoff wavelength longer than 1800 nm, and at a wavelength of 1550 nm, it has chromatic dispersion which is negative and greater than or equal to −150 ps/(nm.km), and a ratio of chromatic dispersion over chromatic dispersion loss lying in the range 30 nm to 500 nm.

It is advantageous for the fiber also to present one or more of the following characteristics:
- chromatic dispersion at 1550 nm less than or equal to −20 ps/(nm.km), or even −50 ps/(nm.km);
- monomode behavior in a cable in band C, typically below 1580 nm;
- monomode behavior in a cable in band L, typically below 1620 nm;
- attenuation of less than 1 dB/km, or indeed 0.8 dB/km at 1550 nm;
- a ratio of chromatic dispersion over attenuation less than or equal to −100 ps/(nm.dB) at 1550 nm, and preferably less than or equal to −150 ps/(nm.dB) at 1550 nm;
- an effective area greater than 12 $\mu m^2$, or 15 $\mu m^2$, and preferably 20 $\mu m^2$, at 1550 nm;
- bending losses in the range 1530 nm to 1620 nm that are less than 400 dB/m, or even less than 100 dB/m for a fiber wound around a former having a radius of 10 mm;
- bending losses in the range 1530 nm to 1620 nm less than 0.05 dB, or even less than $10^{-3}$ dB for 100 turns wound with a radius of 30 mm; and
- sensitivity to microbends at 1550 nm less than or equal to 1, or preferably less than or equal to 0.5.

Monomode behavior in band C or in band L ensures that light propagates properly in the dispersion-compensating fiber. The values for attenuation and for the ratio of chromatic dispersion over attenuation ensure that the fiber can be used in a transmission system with minimum increment in attenuation.

The effective area value makes it possible to use the fiber even at high transmission powers without non-linear effects becoming critical.

Bending losses are evaluated in conventional manner; these limits on bending losses ensure that the dispersion-compensating fiber can be coiled in a repeater module, as in the embodiment of FIG. 1, or can tolerate being incorporated in a cable as in the embodiment of FIG. 2. The sensitivity of the fiber to microbends is evaluated in relative manner, in comparison with the fiber marketed by the Applicant under the reference ASMF 200; it is possible to use the method of flattening the fiber between two grids, which method is conventional.

It is also advantageous for the fiber to present bending losses that are acceptable over a range of use extending from 1530 nm to 1620 nm and not only at 1550 nm; this reduces losses over the entire range of use of the fiber.

FIG. 3 is a diagram showing the ideal index profile for a fiber of the invention; in this embodiment, the index profile is an index profile of the rectangle type, together with a buried trench and a ring, and starting from the center of the fiber it presents:
- a central portion of substantially constant index greater than or equal to the cladding index; and
- an annular portion of index lower than or equal to the cladding index;

the profile as a whole constituting a profile referred to as being "rectangular with a buried or depressed trench".

Around its buried trench, the fiber of FIG. 3 presents a ring, i.e. a portion of index greater than the cladding index, whence the term "rectangle profile with a buried trench and a ring".

FIG. 4 shows another profile for a fiber of the invention. In this embodiment, the fiber has a trapezium profile with a buried trench and a ring. In other words, starting from the center of the fiber, there are to be found:
- a central portion of substantially constant index greater than or equal to the index of the cladding; and
- an annular portion of index less than or equal to the index of the cladding;

these two portions being spaced apart by an annular portion in which the index decreases in substantially linear manner. Overall this constitutes an index profile which is preferred to as a "trapezium with a buried or depressed trench".

As in the embodiment of FIG. 3, this buried trench is surrounded by a ring.

Values for the indices and the radii in various example fibers having profiles of the kinds shown in FIGS. 3 and 4 are given in Table 1 below. In the table, the central rectangle has a radius $r_1$ and its index presents a difference $\Delta n_1$ relative to the index of the cladding, the small base of the trapezium presents a radius $r_{1a}$ and its index presents a difference $\Delta n_1$ relative to the index of the cladding, from which point the index decreases in substantially linear manner to go from the value $\Delta n_1$ to the value $\Delta n_2$; the radius at which the index is equal to the index of silica is written $r_1$. The buried trench extends between radii $r_{1b}$ and $r_2$, and its index presents a difference $\Delta n_2$ relative to the index of the cladding. Finally, the ring extends between radii $r_2$ and $r_3$, and its index presents a difference $\Delta n_3$ relative to the index of the cladding. The profiles of fibers 1 to 4 are rectangle profiles, and the profiles of fibers 5 to 7 are trapezium profiles.

TABLE 1

|  | $r_{1a}$ (μm) | $r_1$ (μm) | $r_{1b}$ (μm) | $r_2$ (μm) | $r_3$ (μm) | $10^3 \Delta n_1$ | $10^3 \Delta n_2$ | $10^3 \Delta n_3$ |
|---|---|---|---|---|---|---|---|---|
| Fiber 1 | 1.65 | 1.65 | 1.65 | 5 | 6.7 | 20.4 | −6.5 | 7 |
| Fiber 2 | 1.7 | 1.7 | 1.7 | 5.9 | 7.6 | 20.4 | −7.5 | 10.8 |
| Fiber 3 | 1.8 | 1.8 | 1.8 | 5.8 | 7.4 | 18.5 | −6.9 | 10.9 |
| Fiber 4 | 1.8 | 1.8 | 1.8 | 5.7 | 7.2 | 17.6 | −5.3 | 11.2 |
| Fiber 5 | 1.35 | 1.8 | 1.95 | 5.75 | 7.4 | 20.5 | −6.9 | 11 |
| Fiber 6 | 1.3 | 1.7 | 1.85 | 6 | 7.65 | 21.5 | −7 | 11 |
| Fiber 7 | 1.3 | 1.8 | 1.9 | 5.6 | 7.15 | 20.5 | −5.3 | 11 |

In all cases relating to the invention (Examples 2 to 7), the index differences between the core and the cladding are no more than $21.5 \times 10^{-3}$; in other words the difference between the index at any point in the fiber and the index of the cladding is less than $25 \times 10^{-3}$. This feature ensures that the fiber remains simple to manufacture, and that attenuation is limited. The figure of merit is thus greater than in state of the art fibers.

Fiber 1 is given by way of comparison; it has a theoretical cutoff wavelength that is shorter than that of the invention; it can be seen from Table 2 that this fiber presents, other things being equal, an effective area that is smaller and a figure of merit that is smaller in absolute value than the fibers 4 and 7 of the invention.

These values make it possible to obtain fibers presenting propagation characteristics as given in Table 2, in which:

$\lambda_{cth}$ is the theoretical cutoff wavelength in nm;

$S_{eff}$ is the effective section area at 1550 nm in $\mu m^2$;

C is the chromatic dispersion at 1550 nm in ps/(nm.km);

C' is the chromatic dispersion slope at 1550 nm in ps/(nm$^2$.km);

C/C' is the ratio of chromatic dispersion over chromatic dispersion slope at 1550 nm, in nm;

α is the attenuation at 1550 nm, in dB/km;

C/α is the ratio of chromatic dispersion over attenuation in ps(nm.dB):

$PC_{1550}$ is the bending loss value at 1550 nm, in dB/m, for the fiber being wound around a former having a radius of 10 mm;

$PC_{1620}$ is the bending loss value at 1620 nm, in dB/m, for the fiber being wound around a former having a radius of 10 mm; and $S_{\mu c}$ is sensitivity to microbending measured as explained above, at 1550 nm.

TABLE 2

|  | $\lambda_{cth}$ nm | $S_{eff}$ $\mu m^2$ | C ps/(nm · km) | C/C' nm | α dB/km | C/α ps/nm · dB | $PC_{1550}$ dB/m | $PC_{1620}$ dB/m | $S_{\mu c}$ |
|---|---|---|---|---|---|---|---|---|---|
| 1 | 1710 | 18 | −85 | 315 | >0.60 | >−150 | 0.1 | 5 | <0.5 |
| 2 | 2015 | 16 | −80 | 135 | <0.65 | <−130 | 0.2 | 15 | <0.5 |
| 3 | 2010 | 19 | −82 | 170 | <0.5 | <−150 | 0.3 | 15 | <0.5 |
| 4 | 2010 | 23 | −81 | 305 | <0.5 | <−150 | 0.2 | 5 | <0.5 |
| 5 | 2100 | 17 | −110 | 130 | <0.65 | <−150 | 0.6 | 40 | <0.5 |
| 6 | 2070 | 20 | −115 | 165 | <0.6 | <−200 | 0.3 | 20 | <0.5 |
| 7 | 2050 | 21 | −110 | 290 | <0.6 | <−200 | 0.3 | 10 | <0.5 |

The cutoff wavelength given here is the theoretical cutoff wavelength; in practice, the cutoff wavelength as measured on a cable is shorter by several hundreds of nm; it would be understood that the fiber is effectively a monomode fiber in the range of wavelengths used for signals, in particular in band C, and in band L, where appropriate.

The properties of fibers of the invention enable them to be used as dispersion-compensating fibers, as mentioned above.

In all of the examples of Table 1, 5% variations in the index $\Delta n_1$ of the central portion, or 10% variations in the indices $\Delta n_2$ and $\Delta n_3$ of the buried trench and of the ring, make it possible to obtain results that are similar. The same applies to the radii which can vary by 10% for $r_1$ and $r_2$ and by 5% for $r_3$ relative to the value given in the examples of Table 1, while still obtaining similar results.

In general, the fiber profile can be described as follows. Firstly the profile is a trapezium or rectangle profile with a buried or depressed trench and a ring. The central portion has an index difference relative to the cladding which satisfies:

$$16 \times 10^{-3} \leq \Delta n_1 \leq 24 \times 10^{-3}$$

As mentioned above, $r_1$ can be referred to as the greatest radius of the portion having index greater than the cladding index, which index remains constant at values less than $r_1$ for a rectangle profile, but not for a trapezium profile. With a trapezium profile, it is advantageous for the radius $r_1$ expressed in micrometers to satisfy:

$$1.5 \ \mu m \leq r_1 \leq 2.3 \ \mu m$$

For the buried trench, it is possible to use values for the index difference $\Delta n_2$ and for the outer radius $r_2$ such that they satisfy:

$$-7.5 \times 10^{-3} \leq \Delta n_2 \leq -3.5 \times 10^{-3}$$

and $$4.5 \ \mu m \leq r_2 \leq 6.9 \ \mu m$$

For the ring, it is possible to select index difference values $\Delta n_3$ and outer radius values $r_3$ that satisfy:

$$3 \times 10^{-3} \leq \Delta n_3 \leq 16 \times 10^{-3}$$

or preferably $$3\times10^{-3} \leq \Delta n_3 \leq 14\times10^{-3}$$

and $$6.8\ \mu m \leq r_3 \leq 8.5\ \mu m$$

Other fiber characteristics are possible. Thus, it is possible to use the parameter $S_1$ as defined by:

$$S_1 = 2 \cdot \int_0^{r_1} \Delta n(r) \cdot r \cdot dr$$

This parameter amounts to multiplying an area by an index. This parameter is simple to apply both to a trapezium profile and to a rectangle profile, and it represents the increase of index in the vicinity of the core of the fiber. It preferably satisfies the following:

$$40\times10^{-3} \leq S_1 \leq 100\times10^{-3}\ \mu m^2$$

or preferably $$50\times10^{-3} \leq S_1 \leq 80\times10^{-3}\ \mu m^2$$

It is also possible to use the parameter $S_2$, defined as follows:

$$S_2 = 3 \cdot \int_0^{r_1} \Delta n(r) \cdot r^2 \cdot dr$$

Physically, this parameter represents the correspondence between a rectangle profile and a trapezium profile in the theory of equivalent fibers. This parameter preferably satisfies:

$$60\times10^{-3} \leq S_2 \leq 200\times10^{-3}\ \mu m^3$$

or preferably $$70\times10^{-3} \leq S_2 \leq 150\times10^{-3}\ \mu m^3$$

To characterize the ring, it is also possible to use the parameter $S_3$, as defined below:

$$S_3 = 2 \cdot \int_{r_2}^{r_3} \Delta n(r) \cdot r \cdot dr$$

which corresponds to the parameter $S_1$, but for the ring. It is thus advantageous for:

$$140\times10^{-3} \leq S_3 \leq 350\times10^{-3}\ \mu m^2$$

or preferably $$160\times10^{-3} \leq S_3 \leq 310\times10^{-3}\ \mu m^2$$

The fiber of the invention can be manufactured by the person skilled in the art using conventional techniques such as MCVD, outside vapor deposition (OVD) or the other techniques commonly employed in manufacturing optical fibers.

Naturally, the present invention is not limited to the embodiments and implementations described and shown, and it can be varied in numerous ways by the person skilled in the art. It is clear that the profile of FIGS. 3 and 4 and the examples of radii and indices are given purely by way of example and that other profiles could enable fibers to be obtained that present the characteristics of the invention. The fiber of the invention can be used in the FIG. 1 embodiment in a transmission system having repeaters, but it can also be used in a transmission system without repeaters. More than one amplifier can be used in a dispersion-compensating module, for example one amplifier after the dispersion-compensating fiber and another before it.

What is claimed is:

1. An optical fiber presenting a theoretical cutoff wavelength longer than or equal to 1800 nm, chromatic dispersion that is negative and greater than or equal to −150 ps/(nm.km), and a ratio of chromatic dispersion over chromatic dispersion slope lying in the range 30 nm to 500 nm for a wavelength of 1550 nm.

2. The fiber of claim 1, presenting bending losses less than 400 dB/m, and preferably less than 100 dB/m, for a wavelength in the range 1530 nm to 1620 nm, when the fiber is wound on a former having a radius of 10 mm.

3. The fiber of claim 1, presenting bending losses less than 0.05 dB, and preferably less than $10^{-3}$ dB, for a wavelength lying in the range 1530 nm to 1620 nm, for a winding of 100 turns on a former having a radius of 30 mm.

4. The fiber of claim 1, presenting a ratio of chromatic dispersion over attenuation less than or equal to −100 ps/(nm.dB), and preferably less than or equal to −150 ps/(nm.dB), for a wavelength lying in the range 1530 nm to 1620 nm.

5. The fiber of claim 1, presenting, for a wavelength of 1550 nm, an effective area greater than or equal to 12 $\mu m^2$, preferably greater than or equal to 15 $\mu m^2$, or even 20 $\mu m^2$.

6. The fiber of claim 1, presenting, for a wavelength of 1550 nm, chromatic dispersion less than or equal to −20 ps/(nm.km), preferably less than or equal to −50 ps/(nm.km).

7. The fiber of claim 1, presenting, for a wavelength of 1500 nm, sensitivity to microbends less than or equal to 1, and preferably less than or equal to 0.5.

8. The fiber of claim 1, presenting an index difference between the index at any point of the fiber and the index of the cladding that is less than or equal to $30\times10^{-3}$, and preferably less than or equal to $25\times10^{-3}$.

9. The fiber of claim 1, presenting polarization mode dispersion less than or equal to 0.5 ps/km$^{1/2}$.

10. The fiber of claim 1, presenting attenuation less than 1 dB/km, and preferably less than 0.8 dB/km.

11. The fiber of claim 1, presenting a theoretical cutoff wavelength longer than or equal to 1850 nm.

12. The fiber of claim 1, presenting an index profile in the form of a rectangle with a depressed trench and a ring.

13. The fiber of claim 1, presenting an index profile in the form of a trapezium with a depressed trench and a ring.

14. The fiber of claim 12, wherein the difference between the index of the rectangle or of the trapezium and the index of the cladding lies in the range $16\times10^{-3}$ to $24\times10^{-3}$, and wherein the radius of the portion of the fiber presenting an index greater than that of the cladding lies in the range 1.5 $\mu m$ and 2.3 $\mu m$.

15. The fiber of claim 12, wherein the difference between the index of the depressed trench and the index of the cladding lies in the range $-7.5\times10^{-3}$ to $-3.5\times10^{-3}$, and wherein the outer radius of the trench lies in the range 4.5 $\mu m$ to 6.9 $\mu m$.

16. the fiber of claim 12, wherein the difference between the index of the ring and the index of the cladding lies in the range $3\times10^{-3}$ to $16\times10^{-3}$, preferably in the range $3\times10^{-3}$ to $14\times10^{-3}$, and wherein the outer radius of the ring lies in the range 6.8 $\mu m$ to 8.5 $\mu m$.

17. The fiber of claim 12, wherein twice the integral of the product of the radius multiplied by the index between zero radius and the outer radius of the central portion of the fiber presenting an index greater than that of the cladding lies in the range $40 \times 10^{-3}$ $\mu m^2$ to $100 \times 10^{-3}$ $\mu m^2$, preferably in the range $50 \times 10^{-3}$ $\mu m^2$ to $80 \times 10^{-3}$ $\mu m^2$.

18. The fiber of claim 12, wherein three times the integral of the product of the square of the radius multiplied by the index between zero radius and the outer radius of the central portion of the fiber presenting an index greater than that of the cladding lies in the range $60 \times 10^{-3}$ $\mu m^3$ to $200 \times 10^{-3}$ $\mu m^3$, preferably in the range $70 \times 10^{-3}$ $\mu m^3$ to $150 \times 10^{-3}$ $\mu m^3$.

19. The fiber of claim 12, wherein twice the integral of the product of the radius multiplied by the index between the inner radius and the outer radius of the ring lies in the range $140 \times 10^{-3}$ $\mu m^2$ to $350 \times 10^{-3}$ $\mu m^2$, and preferably in the range $160 \times 10^{-3}$ $\mu m^2$ to $310 \times 10^{-3}$ $\mu m^2$.

20. A transmission system in which the line fiber comprises a step index monomode fiber, dispersion-compensated by a fiber according to claim 1.

21. A transmission system in which the line fiber comprises a dispersion-shifted fiber dispersion-compensated by a fiber according to claim 1.

22. The system of claim 20, wherein the cumulative chromatic dispersion in each channel in the range 1530 nm to 1610 nm is less than 100 ps/nlfn, and preferably less than 50 ps/nm, on average per 100 km of transmission.

23. A dispersion-compensation module comprising an amplifier and a segment of fiber according to claim 1.

* * * * *